United States Patent [19]

Aust et al.

[11] Patent Number: 4,891,320
[45] Date of Patent: Jan. 2, 1990

[54] METHODS FOR THE DEGRADATION OF ENVIRONMENTALLY PERSISTENT ORGANIC COMPOUNDS USING SHITE ROT FUNGI

[75] Inventors: Steven D. Aust; John A. Bumpus, both of North Logan, Utah; Ming Tien, State College, Pa.

[73] Assignee: Utah State University Foundation, Logan, Utah

[21] Appl. No.: 183,114

[22] Filed: Apr. 19, 1988

Related U.S. Application Data

[63] Continuation-in-part of Ser. No. 702,944, Feb. 19, 1985, abandoned.

[51] Int. Cl.⁴ .................. C12N 01/38; C12R 01/645; C02F 03/34; C02F 03/02
[52] U.S. Cl. .................................... 435/262; 435/911; 435/254; 210/611; 210/632; 210/909; 162/1; 162/72
[58] Field of Search ............... 435/262, 254, 195; 210/606, 610, 611, 632, 909; 162/1, 9, 72

[56] References Cited

U.S. PATENT DOCUMENTS

| | | | |
|---|---|---|---|
| 3,979,283 | 9/1976 | Prudom | 210/11 |
| 4,478,683 | 10/1984 | Orndorff | 162/161 |
| 4,554,075 | 11/1985 | Chang et al. | 210/611 |
| 4,588,506 | 5/1986 | Raymond et al. | 210/606 |
| 4,623,465 | 11/1986 | Klibanov | 210/632 |
| 4,655,926 | 4/1987 | Chang et al. | 210/611 |

OTHER PUBLICATIONS

Eaton, Enzyme and Microbial Technology 7(5), pp. 194–196 (1985), C.A. 103: 1754f.
Kopylow, Zesz. Nauk.-Akad. Roln. Szczecinie 84, pp. 135–145 (1980), C.A. 96: 99401y.
Kamaya et al., Wood Research 70, pp. 25–28 (1984) Ca. 101: 132759t, B.A. 78(a): 66703.
Aust et al., "Biodegradation of Halogenated Hydrocarbons," EPA Environmental Research Brief, EPA 600/M-87/012, pp. 1–5 (Jun. 1987).
Bluestone et al., "Microbes to the Rescue–Hazardous Waste Biotreatment Fights for Recognition," Chemical Week, pp. 1–6 (Oct. 29, 1986).
Budiansky et al., "Toxic Wastes? A Little Fungus May Help," U.S. News & World Report, p. 85 (Nov. 9, 1987).
Bumpus et al., "Biodegradation of Environmental Pollutants by the White Rot Fungus Phanerochaete Chrysosporium," USEPA Eleventh Annual Research Symposium on Toxic Waste Disposal, pp. 120–126 (Apr. 1985).

(List continued on next page.)

*Primary Examiner*—John Edward Tarcza
*Attorney, Agent, or Firm*—Workman, Nydegger & Jensen

[57] ABSTRACT

A process for degrading environmentally persistent organic pollutant compounds by reacting those pollutant compounds with fungal enzymes containing a lignin-degrading enzyme and hydrogen peroxide. This reaction preferably takes place under aerobic conditions such that the organic pollutant compounds are degraded. Using the present invention, degradation to carbon dioxide and water is possible. Alternatively, the reaction may be halted to leave desirable reaction intermediates.

The enzyme and hydrogen peroxide system of the present invention is found to be ideal for degrading various types of orgaic pollutants. Moreover, the reaction system is nonspecific. As a result, only a single type of fungus or fungus-generated enzyme system is required in order to degrade a wide spectrum of pollutants.

One embodiment of the present invention relates to a preferred process where the enzyme (peroxidase) and hydrogen peroxide are provided by a lignin-degrading fungi or fungi mixed with the pollutant organic compound. Adding the living fungus avoids the need for introducing the hydrogen peroxide and enzyme periodically into the reaction mix, since the fungus produces both the extracellular enzyme and hydrogen peroxide.

67 Claims, 7 Drawing Sheets

OTHER PUBLICATIONS

Bumpus et al., "Studies on the Biodegradation of Organopollutants by a White Rot Fungus," International Conference on New Frontiers for Hazardous Waste Management, pp. 404-410 (Sep. 15-18, 1985).

Bumpus et al., "Biodegradation of Chlorinated Organic Compounds by Phanerochaete Chrysosporium, a Wood-Rotting Fungus," Solving Hazardous Waste Problems, Learning from Dioxins, American Chemical Society, Chapter 28 (1987).

Bumpus et al., "Biodegradation of Organopollutants by Phanerochaete Chrysosporium: Practical Considerations, In: Land Disposal, Remedial Action, Incineration and Treatment of Hazardous Waste," Thirteenth Annual Research Symposium, Cincinnati, Ohio., EPA/600/9-87/015, pp. 411-418 (May 1987).

Bumpus et al., "Biodegradation of DDT [1,1,1-Trichloro-2,2-Bis (4-Chlorophenyl)Ethane] by the White Rot Fungus Phanerochaete Chrysosporium," Applied and Environmental Microbiology, pp. 2001-2008 (Sep. 1987).

Bumpus et al., "Biodegradation of Environmental Pollutants by the White Rot Fungus Phanerochaete Chrysosporium: Involvement of the Lignin Degrading System," Bioessays, vol. 6, No. 4, pp. 166-170 (undated).

Chang et al., "Fungal Decolorization of Bleach Plant Effluents," Recent Advances in Lignin Biodegradation: Proceedings of an International Seminar, pp. 257-268 (May-Jun. 1983).

Eaton et al., "Fungal Decolorization of Kraft Bleach Plant Effluents," vol. 63, No. 10, Tappi (Oct. 1980).

Forney et al., "The Involvement of Hydrozyl Radical Derived from Hydrogen Peroxide in Lignin Degradation by the White Rot Fungus Phanerochaete Chrysosporium," The Journal of Biological Chemistry, vol. 257, No. 19, pp. 11455-11462 (Oct. 10, 1982).

Jeffries et al., "Nutritional Regulation of Lignin Degradation by Phanerochaete Chrysospirum," Applied and Environmental Biology, vol. 42, No. 2, pp. 290-296 (1981).

Keyser et al., "Ligninolytic Enzyme System of Phanerochaete Chrysosporium: Synthesized in the Absence of Lignin in Response to Nitrogen Starvation," Journal of Bacteriology, vol. 135, No. 3, pp. 790-797 (Sep. 1978).

Leatham et al., "Degradation of Phenolic Compounds and Ring Cleavage of Catechol by Phanerochaete Chrysosporium," Applied and Environmental Microbiology, vol. 46, No. 1, pp. 191-197 (Jul. 1983).

Lundquist et al., "Fungal Degradation of Kraft Lignin and Lignin Sulfonates Prepared from Synthetic 14C-Lignins," Arch. Microbiol., vol. 112, pp. 291-296 (1977).

Sundman et al., "Fungal Decolorization of Kraft Bleach Plant Effluent—Fate of the Chromophoric Material," Tappi, vol. 64, No. 9 (Sep. 1981).

Zurer, P., "Fungus Shows Promise in Hazardous Waste Treatment," Chemical and Engineering News, pp. 17-19 (Sep. 14, 1987).

Lyr, Nature (Jul. 1962), p. 289.

Lyr, Phytopathologische Zeitschrifte 47, No. 1, 73-83 (1963).

Kirk et al., Arch Microbiol. 117, 277-285 (1978).

Kirk et al., Applied and Environmental Microbiology, vol. 32, pp. 192-194 (Jul. 1976).

Weinstein et al., Applied and Environmental Microbiology, pp. 535-540, (Mar. 1980).

Cernaglia et al., Applied and Environmental Biology, pp. 1070-1075, (May 1982).

Cohen and Gabriele, Applied and Environmental Biology, pp. 23-27 (Jul. 1982).

Faison and Kirk, Applied and Environmental Microbiology, pp. 1140-1145 (Nov. 1983).

Gold et al., Arch. of Biochem. and Biophysics, vol. 234, No. 2, Nov. 1, pp. 353-362 (1984).

Bumpus et al., Science, pp. 1434-1436 (Jun. 21, 1985).

Merck & Co., Inc. The Merck Index, p. 345 (1983) § 2371.

Bumpus and Aust, "Mineralization of Recalcitrant Environmental Pollutants by a White Rot Fungus" Treatment, pp. 146-151 (1987).

S. C. Jong, Ph.D. and M. J. Gantt, M.L.S., American Type Culture Collection Catelogue of Fungi/Yeasts (1984).

Aust, Steven D. et al., "Biodegradation of Environmental Pollutants", Proposal to U.S. Environmental Protection Agency, Application for Federal Assistance (approximate date of 3/1/87).

(List continued on next page.)

OTHER PUBLICATIONS

Aust, Steven D. et al., "Application of a White Rot Fungus for the Biodegradation of Coal Tar", Proposal to Department of Energy/Pittsburgh Energy Technology Center (Mar. 11, 1987).

Aust, Steven D. et al., "Application of a White Rot Fungus for the In Situ Treatment of Oil Contaminated Soil", Proposal to the U.S. Environmental Protection Agency, Application for Federal Assistance (May 28, 1987).

Aust, Steven D. et al., "Biological Hazardous Waste Management", Proposal to the Department of Health and Human Services, Public Health Service Grant Application (11/30/87).

Bumpus, John A. et al., "Biodegradation of Organopollutants by a White Rot Fungus in a Bench Scale Wastewater Treatment System", Application for Federal Assistance to the Department of Interior (Jan. 19, 1988).

Aust, Steven D. et al., "Application of a White Rot Fungus for the Biodegradation of Coal Tar", Proposal submitted to the Department of Energy (Jan. 27, 1988).

Aust, Steven D. et al., "Biodegradation of Environmental Pollutants", Proposal to the U.S. Environmental Protection Agency, Application for Federal Assistance (Feb. 25, 1988).

METHODS FOR THE DEGRADATION OF ENVIRONMENTALLY PERSISTENT ORGANIC COMPOUNDS USING SHITE ROT FUNGI

RELATED APPLICATIONS

This application is a continuation-in-part application of copending application Ser. No. 06/702,944 filed Feb. 19, 1985, now abandoned, and entitled PROCESS FOR THE DEGRADATION OF ENVIRONMENTALLY PERSISTENT ORGANIC COMPOUNDS, which application is incorporated herein by this reference.

BACKGROUND

1. The Field of the Invention

The present invention is related to the degradation of environmentally persistent organic compounds. More particularly, the present invention employs a lignin-degrading fungus (a white rot fungi) or the biodegrading enzyme system produced by a fungi, in order to degrade the environmentally persistent organic compounds.

2. The Prior Art Background

Large quantities of environmentally persistent organic compounds have been disposed of in the biosphere. The term "environmentally persistent" or "persistent" organic compounds is used herein to include those organic compounds which are only slowly degraded, if they are degraded at all, in the natural environment. Unfortunately, the effects of the environment, including the action of microorganisms, are not sufficient to degrade and dispose of these organic compounds.

Because of the slow degradation of such organic compounds, they present extreme problems in disposal. One such category of environmentally persistent organic compounds comprises organohalides. Other categories of such persistent organic compounds include aromatic organic compounds, particularly cyclic and polycyclic aromatic organics.

Persistent organic compounds, such as organohalides, are a serious threat to the environment because they are often toxic and carcinogenic. Moreover, since they are difficult to degrade and are not easily metabolized, these compounds tend to "bioaccumulate" in the body fat of animals occupying higher trophic levels.

Some of the organohalide compounds which have been found to pose particular problems include polychlorinated biphenyls (PCB) and polybrominated biphenyls ("PBB"). Since these compounds have been important to twentieth century manufacturing, they are today found to be present in river beds, landfills, and other disposal sites near industrial centers.

In addition, PCB's have been used extensively in electrical transformers and in various lubricants and oils Thus, disposal sites for these materials and equipment often contain large concentrations of PCB's and other organohalides. Other types of environmentally persistent molecules include DDT, dioxin, and many pesticides.

Attempts have been made to remove and degrade environmentally persistent compounds such as the organohalides of the type mentioned above. For example, it has been suggested that materials of this type be incinerated.

Indeed, attempts have been made to burn PCB's and other related compounds. It has, been found, however, that incineration is usually impractical where there are large volumes of waste to be processed or where the matrix of material contained in the compound is difficult to process. For example, PCB-contaminated soil would be difficult to process using an incineration procedure. In addition, incineration must take place far from population centers. Accordingly, transportation and processing costs become very high.

Other attempts to clean up disposal sites containing organohalides and other complex organics have focused on simple removal and/or isolation of the material. For example, soil containing contamination is excavated and moved to an approved hazardous waste disposal site.

Problems with this method are clear. Removal does nothing to degrade or remove the pollutant. Removal simply changes the location of the pollutant. An additional problem with removal procedures is the expense. Excavation of large quantities of soil contaminated by DDT, dioxin, PCB, or the like, is extremely difficult, time-consuming and expensive. The material once excavated must then be transported to a certified hazardous waste disposal site. All of this makes removal a technically difficult, expensive, and often impractical process.

One additional alternative is degradation of these pollutants through the use of microorganisms. Unfortunately, few microorganisms have any significant effect on halogenated organic compounds. Those microorganisms which do, however, are only able to metabolize halogenated organic compounds partially and selectively, and are frequently affected by the intermediate compounds encountered in the biodegradation process. The intermediates produced through biodegradation may themselves be extremely toxic to both the microorganism and other organisms in the environment.

Some efforts to use microorganisms have focused on strategies to enhance the relative abilities of these organisms to degrade various persistent xenobiotics. For example, there have been a number of studies in which microorganisms have been adapted to grow on carbon sources whose structure resembles the organic pollutant under study. When the microorganism is presented with a structurally similar organic pollutant, it theoretically is often also metabolized. This is known as "analog induced" metabolism.

Others have attempted to culture microorganisms using the organic pollutant itself as the source of carbon. It is intended that isolated strains could be used to inoculate areas in the environment that have been contaminated with the pollutant in question.

Still other studies have focused on the use of anaerobic organisms. This strategy has been adopted because many organic pollutants are found in lake and river sediments and landfills, sites where oxygen availability is limiting.

Problems have been encountered in each of these approaches. Most of these prior art microorganisms have been unable to degrade all pollutants which they encounter. Most microorganisms are selective, rather than nonselective, in their action. Thus, mixtures of pollutants are not effectively treated using these microorganisms.

Accordingly, it would be a significant advancement in the art if a system could be provided for employing a nonspecific microorganism system to degrade other organic compounds, such as organic pollutants. It would be a major advancement in the art to provide an enzyme system to degrade PCB's, PBB's, dioxin, DDT, and the like. It would be another advancement in the art to provide a system whereby the fungus itself could be used in environmental control. It would be a related advancement if, in such a system, the fungus itself could be introduced to the polluted soil or other polluted site to degrade the subject pollutants.

Such methods are disclosed and claimed herein.

BRIEF SUMMARY AND OBJECTS OF THE INVENTION

The present invention relates to a process for degrading environmentally persistent compounds with fungal enzymes containing a lignin-degrading enzyme and hydrogen peroxide. This reaction preferably takes place under aerobic conditions such that the organic pollutant compounds are degraded. Using the present invention, degradation to carbon dioxide and water is possible. Alternatively, the reaction may be halted to leave desirable reaction intermediates.

The enzyme and hydrogen peroxide system of the present invention is found to be ideal for degrading various types of organopollutants. Moreover, the reaction system is nonspecific. As a result, only a single type of fungus or fungus-generated enzyme system is required in order to degrade a wide spectrum of pollutants.

One embodiment of the present invention relates to a preferred process where the enzyme (peroxidase) and hydrogen peroxide are provided by a lignin-degrading fungi or fungi mixed with the pollutant organic compound. Adding the living fungus avoids the need for introducing the hydrogen peroxide and enzyme periodically into the reaction mix, since the fungus produces both the extracellular enzyme and hydrogen peroxide.

Many fungi of the class basidimycetes are collectively known as "white rot fungi" and are ubiquitous in nature. Hence, these fungi can be released in concentrated form in soil or waste containing polluted organic compounds since no new organisms representing a potential danger to the environment are used.

The nutrients for the fungi are abundantly available or are sometimes present in the substrates containing the pollutant organic compounds. Examples of such substrates are contaminated sediments in rivers and lakes. These sediments are generally of plant origin and often highly contaminated with PCB or other pollutants.

As used herein, the term "white rot fungus" is intended to mean a fungus which is capable of degrading aromatic carbons of lignin to carbon dioxide. Generally, any fungus herein is to be considered within the scope of the present invention. It will be appreciated that white rot fungi are presently preferred and that they have an extremely highly developed lignin-degrading enzyme system. One presently preferred fungus is *Phanerochaete chrysosporium* which has been used widely in lignin degradation experiments. This fungus is known to produce lignin-degrading peroxidases having molecular weights in the range of from 38,000 daltons to about 45,000 daltons.

The lignin-degrading peroxidase system of *Phanerochaete chrysosporium*, or other fungi which degrade lignin, can be used for the reaction with a pollutant organic compound because of the fact that the lignin-degrading system of these fungi are highly nonspecific. As mentioned above, it is not necessary to condition the fungi to degrade specific organic species because the lignin-degrading system will degrade many types of molecules in addition to lignin.

The lignin-degrading peroxidase can be obtained in purified form by taking an extracellular filtrate from the fungi, dialyzing the filtrate and then lyophilizing the dializate to obtain a concentrate of the enzyme. The peroxidase and the hydrogen peroxide can be reacted with the pollutant organic compound in aqueous solution or suspension. The hydrogen peroxide can be provided either directly or generated in situ using a hydrogen peroxide generating enzyme such as glucose oxidase.

*Phanerochaete chrysosporium* can be grown in a low nitrogen containing growth medium which has been found to stimulate lignolytic activity. The cultures are preferably grown at 37° to 39° C. for about six days in a source of carbon nitrogen, minerals, and the vitamin Thiamine as described in Kirk et al., Archives of Microbiology 117:277-285 (1978) (hereinafter "Kirk").

The pollutant organic compounds are then mixed with various aerobic matrices. The matrices include lignin and cellulose-derived materials such as shredded paper, wood shavings, sawdust, corn cobs, and humus. A matrix which provides nutrients to the fungus but which is not consumed by competing microorganisms is preferred. Thus, a lignin containing matrix may be preferred to allow the fungus to thrive without being subjected to competition by other nonlignin degrading microorganisms.

It has been found that the secondary metabolism which induces the peroxidase results in complete degradation of pollutant compounds, leaving carbon dioxide and water as end products. Alternatively, the process may be stopped to produce any desired intermediate. For example, an intermediate of DDT degradation is dicofol, an effective insecticide which is not as toxic or as environmentally persistent as DDT.

Accordingly, it is an object of the present invention to provide a process for degrading organic compounds which are persistent environmental pollutants.

It is a related object of the present invention to provide a process which uses an enzyme and hydrogen peroxide for the degradation of the organic compounds.

It is also an object of the present invention to provide a system employing a nonspecific lignin degrading enzyme system produced by white rot fungi.

It is another object of the present invention to employ the nonspecific lignin degrading enzyme system to degrade the organic pollutant molecules.

It is a related object of the present invention to provide an enzyme system which degrades PCB, PBB, dioxin, DDT, and related halogenated aromatics.

It is another object of the present invention to provide a system for degrading those pollutants insitu.

Further still, it is an object of the present invention to provide a process which is simple and economical and which does not generated stable unwanted chemical intermediates.

These and other objects of the invention will become more apparent upon reference to the following detailed description, drawings, and appended claims.

DETAILED DESCRIPTION OF THE PREFERRED EMBODIMENTS

Figure 1:
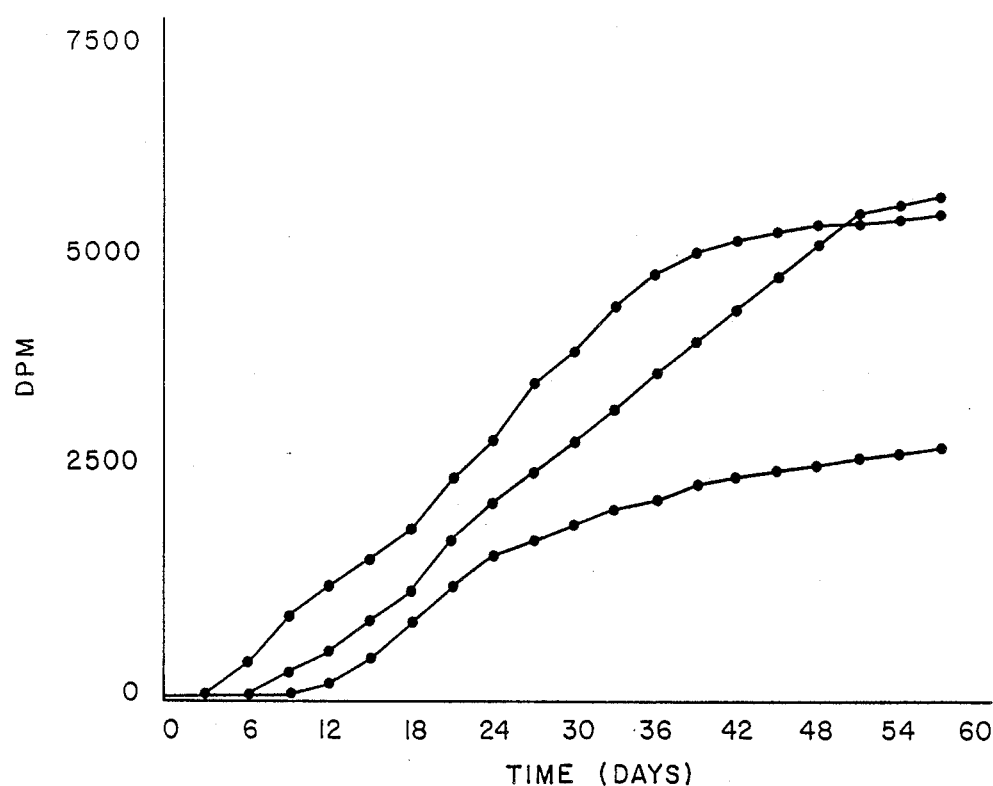
FIG. 1 is a graph showing $^{14}CO_2$ evolution from $^{14}$C-DDT in nitrogen deficient cultures of *Phanerochaete chrysosporium*.

The present invention is directed to a process for degrading organic pollutant compounds. The presently preferred embodiment of the process of the present invention comprises reacting a pollutant compound which persists in the environment with fungal enzymes containing a lignin-degrading peroxidase in the presence of hydrogen peroxide.

Lignin is a naturally occurring, highly complex, non-repeating heteropolymer that produces structural support in woody plants. Like many environmental persistent organic compounds, lignin is resistant to attack by most microorganisms.

Microorganisms that are able to metabolize lignin include some species of fungi and a relatively small number of species of bacteria. Studies of the lignin degrading system of *Phanerochaete chrysosporium*, a common white rot fungus, have shown that in nutrient nitrogen, carbohydrate, or sulfur deficient cultures, this fungus secretes a unique hydrogen peroxide dependent extracellular lignin degrading enzyme system.

Because of its ability to generate carbon-centered free radicals, this enzyme system is able to catalyze numerous, nonspecific cleavage reactions on the lignin lattice. The resultant heterogeneous mixture of low molecular weight aromatic compounds may then undergo further modification or ring cleavage and metabolism to carbon dioxide by more conventional enzyme systems.

The degradation reaction of the present invention preferably takes place under aerobic conditions. The reaction is allowed to continue until the organic pollutant has been degraded to a nontoxic compound or to carbon dioxide and water as may be desired.

It will be appreciated that the present invention may take place in an aqueous medium or by mixing the fungus directly with the pollutants. According to the present invention, the enzyme and hydrogen peroxide may be added directly to the pollution source, or alternatively, the fungus (which will produce the enzyme and hydrogen peroxide) may be added directly. While one alternative or the other may be more efficient or effective under given conditions, either procedure will work for many pollution sources.

According to the latter embodiment, the present invention relates to a process where the lignin-degrading enzymes and hydrogen peroxide are provided by a biologically pure culture of lignin-degrading fungus or fungi mixed with the pollutant organic compound. By adding the fungus directly, the need to introduce the hydrogen peroxide and enzymes periodically into the reaction mixture is avoided because the fungus produces both the extracellular enzyme and hydrogen peroxide.

All fungi which produce lignin-degrading peroxidases fall within the scope of the present invention and are herein referred to as white rot fungi. As mentioned above, there exists may different varieties of white rot fungi. Any fungus which is capable of degrading lignin in the manner described herein is to be considered within the scope of the present invention.

*Phanerochaaete chrysosporium* is the widely accepted experimental standard and, accordingly, data presented herein was produced using that particular fungus.

The present invention also includes processes for controlling the degradation process and even stopping the process at any point that is desirable. For example, it may be desirable under certain circumstances to terminate the degradation reaction when a nontoxic intermediate is present, rather than allowing complete degradation of the pollutant. Alternatively, the present invention relates to total degradation of a pollutant compound to carbon dioxide and water.

One example of a process where it may be desirable to terminate the reaction prior to complete degradation is in the case of degrading DDT. One DDT degradation product is dicofol Dicofol is a useful pesticide which is known to be less toxic and persistent than DDT. Accordingly, it may be desirable to produce dicofol, a desirable and useful chemical compound.

The present invention also teaches the addition of nutrients to the white rot fungus during the process in order to maintain efficient and effective degradation. It is often found that the degradation process may slow after a period of time and the addition of a nutrient such as glucose or substances which will provide glucose will reinitiate the degradation process.

It may be desirable to add a nutrient to the system for which the white rot fungus will not face extensive competition. Accordingly, a lignin containing nutrient is often preferred since competing microorganisms are unable to degrade the lignin and thus deprive the white rot fungus of the nutrient. Examples of lignin containing nutrients include corn cobs, sawdust, and straw. Hence these inexpensive nutrients can be periodically added to the pollution site to assure continuing degradation.

When it is desirable to add the fungus to the pollutant, it is also often desirable to provide an associated nutrient. Accordingly, in one preferred embodiment of the present invention the fungus is mixed with the persistent pollutant along with water and corn cobs, wheat husks, peanut shells, sawdust, or peas.

The mixture of the fungus, water, nutrient, and pollutant is allowed to degrade the pollutant under aerobic conditions using the lignin-degrading peroxidase system of the fungus. At the appropriate time, the reaction may be stopped by adding an organic solvent to terminate the reaction, thereby leaving a desirable intermediate product. Alternatively, degradation may be allowed to proceed until the pollutant has been essentially completely converted to carbon dioxide and water.

The lignin-degrading enzyme system of the white rot fungus has been found to be nonspecific and degradation of a wide variety of organic compounds takes place using the lignin-degrading system of the white rot fungus. In particular, the mechanism is found to be non-stereo-specific. Thus, molecules of various configurations can be degraded by the same fungus system.

As mentioned above, the peroxidases (enzymes) from the white rot fungus can be used directly for reaction with the pollutant organic compound. Alternatively, the peroxidases can be obtained in a purified form by taking a culture filtrate from the fungi, dialyzing the filtrate, and lyophilizing the dializate to prepare a concentrate of the enzyme. The peroxidases and the hydrogen peroxide are then reacted with the pollutant organic compound in aqueous solution or suspension. The hydrogen peroxide can be either directly provided or generated in situ using an $H_2O_2$-generating enzyme such as glucose and glucose oxidase.

The fungus is preferably grown in a low nitrogen-containing growth medium. Such an environment has been found to stimulate lignolytic activity. The cultures are preferably grown at between approximately 37° C. and approximately 39° C. for about six days. A source of carbon, nitrogen, minerals, and the vitamin thiamine are also preferably added to the system.

The pollutant organic compounds treated by the present invention can be mixed with various aerobic matrices. The matrices include lignin, cellulose, wood shavings, sawdust, corn cobs, and humus. Water is added to the amounts of about fifty percent (50%) by weight moisture. The fungus is then added and incubation occurs at approximately 39° C. in air or oxygen.

It is notable that the system of the present invention does not induce pollutant degradation by the presence of the pollutant substrate. Nutrient nitrogen deficiency produces the secondary metabolism which causes production of the enzyme system necessary to degrade the organic pollutant. Thus, in the present invention high levels of substrate (pollutant) are not required in order to initiate degradation.

Degradation enzymes are secreted and appear to have no adverse affect on the fungus. The result is that the initial reactions of pollutant organic compounds occurs extracellularly.

The enzyme secreted by the white rot fungus attacks many recalcitrant organic chemicals. Additionally, this organism causes dehalogenation of organic compounds. Thus, less stable metabolites are formed which may be metabolized to carbon dioxide by more conventional enzyme systems.

The nutrients for the fungi are abundantly available and are generally present in the substrates containing the pollutant organic compounds, including contaminated sediments in lakes in rivers. These sediments are generally of plant origin and may be highly contaminated with PCB and the like.

The fungi require aerobic conditions in order to effectively generate the enzyme system. Accordingly, various systems for aerating the polluted environmental materials may be employed. Equipment for this kind of treatment is well known in the art. For example, sediments only require dredging from the bottom of a river or lake to be placed in a temporary aerobic compost. High rate composting of organic wastes is one potentially economic method of treatment of toxic compounds prior to ultimate usage or disposal of the waste.

Hydrogen peroxide is also commercially available. Thus, the process of the present invention can be conducted chemically in the absence of the fungi by continuously mixing hydrogen peroxide and the enzymes produced by the fungus. This is an alternative to adding the fungus to the system. It will also be appreciated that the process of the present invention can be conducted in an open system in the environment or alternatively in a closed system in a reaction vessel. The present invention is flexible in its application and can be adapted to a wide spectrum of situations.

As mentioned above, the fungus may be packaged for shipment and use in a manner so as not to activate the fungus. Generally, this is accomplished using dry or anaerobic packaging conditions.

In summary, this system degrades numerous types of persistent organic pollutants. The nonspecific lignin degrading system of the white rot fungus is found to be an efficient means for degrading numerous different pollutant molecules.

EXAMPLES

The following examples are illustrative of the process of the present invention but are not intended to limit the scope of the present invention.

EXAMPLE 1

In order to test for the preferred growth temperature for the *Phanerochaete chrysosporium*, six (6) separate 10 ml liquid cultures of *Phanerochaete chrysosporium* were prepared using 1 ml of a spore suspension in 9 ml of a culture medium as described by Forney et al., *Journal of Biological Chemistry* 257:11455 (1986) (hereinafter "Forney et al."). The culture medium was low in nitrogen source which, based upon the results of Forney et al. appears to induce the activity of the fungal culture. Two of the cultures were incubated at 37° C. and four were incubated at room temperature. It was found that the fungus grew better at 37° C., although significant growth did occur at room temperatures.

EXAMPLE 2

In this experiment 2,4,5,2',4',5'-hexabromobiphenyl (HBB) was used as a model halogenated bicyclic environmental pollutant. The compound was incubated in an aqueous solution containing four (4) day old cultures of *Phanerochaete chrysosporium* as described by Forney et al. The vials were incubated at 37° C. and the vials were tested at 0, 2 and 6 days post inoculation for the presence of HBB.

The contents of each vial upon testing was quantitatively transferred to a 15 ml graduated centrifuge tube with rinses using acetone. The volume was adjusted to 10.0 ml in acetone. A 5.0 ml aliquot of each of these samples was evaorated to approximately 0.5 ml, extracted with 5 ml of toluene, and passed over a 9 centimeter by 0.7 centimeter Florsil column with elution by 10 ml of toluene. The samples were then adjusted to a final volume of 10.0 ml with toluene and subjected to gas chromatographic analysis. The results of the analysis are shown in Table 1.

TABLE 1

| Sample (Time) | Percent Recovered |
| --- | --- |
| 0 days | 81.9 |
| 2 days | 23.3 |
| 6 days | 18.3 |

As can be seen from Example 1, the concentration of HBB was substantially reduced as a result of fungal degradation. Over a period of time, it appears that the HBB or intermediate thereof could be completely degraded by the process by repeated treatments.

EXAMPLE 3

In this example DDT (1,1-Bis(4-chlorophenyl)-2,2,2-trichloroethane) was assayed for degradation by *Phanerochaete chrysosporium.*

Two 10 milliliter cultures in 125 ml Erlenmeyer flasks received 3.4 microliters of DDT in acetone (50 mg/10 ml) which produced a concentration of 1.7 ppm DDT. At the time the DDT was added to the culture, the culture was four (4) days old. The cultures were incubated at 37° C. with the DDT under an atmosphere of air.

Eighteen (18) days later the incubation by the *Phanerochaete chrysosporium* was terminated by adding 25 ml of acetonitrile to the culture and the mixture was homogenized in a homogenizer (10–20 strokes). The mixture was transferred to a separatory funnel and vigorously shaken (1 minute) with 2 milliliters of a saturated sodium chloride solution along with 60 ml of water. Approximately 60 ml of petroleum ether was then added to the mixture which was vigorously shaken in the separatory funnel for about 1 to 2 minutes. The aqueous phase was separated and saved. The organic phase was collected in a 100 ml volumetric flask. Approximately 40 ml of petroleum ether was used to rinse all the glassware, the aqueous layer was re-extracted with this volume of petroleum ether, the organic layer was then drained into the 100 ml flask to the 100 ml mark.

A control culture was spiked with 3.4 microliters of DDT (5.0 milligrams/milliliter acetone) and extracted in the same manner. In the same manner 3.4 microliters of DDT (5.0 milligrams/milliliter acetone) in petroleum ether was used as a further control.

The culture extract, the extraction control, and the DDT petroleum ether were assayed by gas chromatograph as in Example 2. Extracts were diluted 1:10 for gas chromatographic analysis to give a 100 final dilution. The result was that 70.0% of the original concentration of DDT remained after 21 days of incubation with the fungus at an initial concentration of 1.7 ppm of DDT.

EXAMPLE 4

The experiment of Example 3 was repeated, except that the cultures were incubated with the DDT in an atmosphere of oxygen and at 39° C. The cultures were treated with oxygen for one (1) minute at 3 day intervals prior to testing. The results are shown in Table 2 for two separate tests.

TABLE 2

| Day | % of DDT Remaining | |
|---|---|---|
| 15 | 39.9 | 40.5 |
| 21 | 20.9 | 25.9 |
| 33 | 26.4 | 20.9 |

As can be seen from this Example, the DDT is significantly degraded. After 33 days, most of the DDT has been removed under the aerobic conditions used in this experiment.

EXAMPLE 5

In this experiment $^{14}C$ labeled DDT was used. Triplicate cultures were prepared with *Phanerochaete chrysosporium* fungus. The triplicate cultures were prepared using 125 ml Erlenmeyer flasks as described by Kirk. The purpose was to determine whether $^{14}CO_2$ would be produced. Each culture contained 110,000 dpm of $^{14}C$-DDT. The culture was assayed for carbon dioxide evolution every three (3) days.

Day three (3) samples were collected for the carbon dioxide evolutions studies. Oxygen was introduced into the closed culture vessel. Gases were expelled through latex tubing equipped with a 22 gauge needle and bubbled into a carbon dioxide trap (5 ml scintillation fluid, 1 ml ethanolamine and 4 ml methanol). The time for gassing was 15 minutes per sample. In the same manner, the day six (6) samples were collected and so on every three (3) days for a total of 57 days. The results are shown in Table 3.

TABLE 3

| $^{14}CO_2$ Trapping From $^{14}C$-DDT | | | | | |
|---|---|---|---|---|---|
| A-0 | DPM | B-0 | DPM | C-O | DPM |
| 3 | 10.4 | 3 | 4.5 | 3 | 1.4 |
| 6 | 43.7 | 6 | 396.7 | 6 | 3.2 |
| 9 | 300.8 | 9 | 965.3 | 9 | 36.7 |
| 12 | 518.5 | 12 | 1290.2 | 12 | 193.5 |
| 15 | 909.3 | 15 | 1582.6 | 15 | 471.5 |
| 18 | 1224.1 | 18 | 1963.0 | 18 | 900.8 |
| 21 | 1826.7 | 21 | 2568.3 | 21 | 1313.3 |
| 24 | 2274.6 | 24 | 3013.0 | 24 | 1623.1 |
| 27 | 2630.3 | 27 | 3656.6 | 27 | 1810.7 |
| 30 | 2992.3 | 30 | 4030.4 | 30 | 2037.3 |
| 33 | 3370.3 | 33 | 4525.4 | 33 | 2238.1 |
| 36 | 3793.5 | 36 | 4929.9 | 36 | 2375.2 |
| 39 | 4172.8 | 39 | 5189.9 | 39 | 2522.5 |
| 42 | 4527.2 | 42 | 5301.6 | 42 | 2641.3 |
| 45 | 4915.9 | 45 | 5399.8 | 45 | 2699.0 |
| 45 | 4915.9 | 45 | 5478.9 | 48 | 2746.9 |
| 51 | 5659.5 | 51 | 5528.8 | 51 | 2793.0 |
| 54 | 5745.9 | 54 | 5578.8 | 54 | 2834.7 |
| 57 | 5855.7 | 57 | 5638.3 | 57 | 2892.3 |

The samples were assayed for radioactivity on a Packard TM Tricarb Liquid Scintillation Spectrometer. The results are graphically illustrated for each of the three samples in FIG. 1. It appeared that considerable variation in the rate of $^{14}CO_2$ production occurred in the identical cultures. Once carbon dioxide evolution began in each culture, however, the slope (i.e., the rate of carbon was observed that no carbon dioxide evolution occurred in any culture until day 6. This result coincides with that found in the literature for lignin degradation.

EXAMPLE 6

The degradation of other $^{14}C$-labeled halogenated organic compounds by *Phanerochaete chrysosporium* was performed. $^{14}C$-2, 4, 5, 2', 4', 5'-hexachlorobiphenyl (HCB); 14C, 3, 4, 3', 4'- tetrachlorobiphenyl (TCP); 14C-lindane and $^{14}C$-2, 3, 7 8 tetrachlorodibenzo-p-dioxin were metabolized to $^{14}CO_2$ by *Phanerochaete chrysosporium.* At the same time it was desirable to be determined whether $^{14}CO_2$ evolution from $^{14}C$ lignin coincides with the $^{14}CO_2$ evolution from halogenated organic compounds. Finally, experiments were conducted to determine if high nitrogen concentration inhibited carbon dioxide evolution from $^{14}$-CDDT. This phenomena of high nitrogen inhibition of $CO_2$ evolution is observed when $^{14}C$-labeled lignin is used as substrate.

Protocol: Cultures were prepared in quintuplicate for, $^{14}C$-DDT $^{14}C$-2,4,5,2',4',5'-HCB, 3,4,3 ', 4'-TCB, $^{14}C$-Lindane and 2,3,7,8-tetrachlorodibezo-p-dioxin ($^{14}C$-TCDD). The culture medium was the same as that used in Example 5. An additional set of five (5) cultures were prepared for $^{14}C$-lignin. Still another five (5) cultures were prepared for $^{14}$C-DDT. These differed from the others in that they contained 12.0 mM diammonium tartrate (24 mM nitrogen) and were designated "high nitrogen."

All cultures were equipped for $^{14}CO_2$ evolution studies as described by Kirk.

All cultures were incubated at 37°-39° C. for 3 days under ambient atmosphere. At day 3, the first time points were taken by flushing with 99.7% Oas described by Kirk. Subsequent time points were taken at three (3) day intervals.

In addition to test flasks, a control was run in which all the components of the culture media were present except the fungus. The results obtained are as follows:

TABLE 4

RESULTS
Lignin

| Day | dpm/3 days | Running Total (dpm) |
|---|---|---|
| 3 | 44 | 44 |
| 6 | 10,888 | 10,932 |
| 9 | 19,257 | 30,189 |
| 12 | 9,560 | 39,749 |
| 15 | 5,575 | 45,324 |
| 18 | 2,144 | 47,468 |
| 21 | 983 | 48,451 |
| 24 | 502 | 48,953 |
| 27 | 427 | 49,380 |

Figure 4:
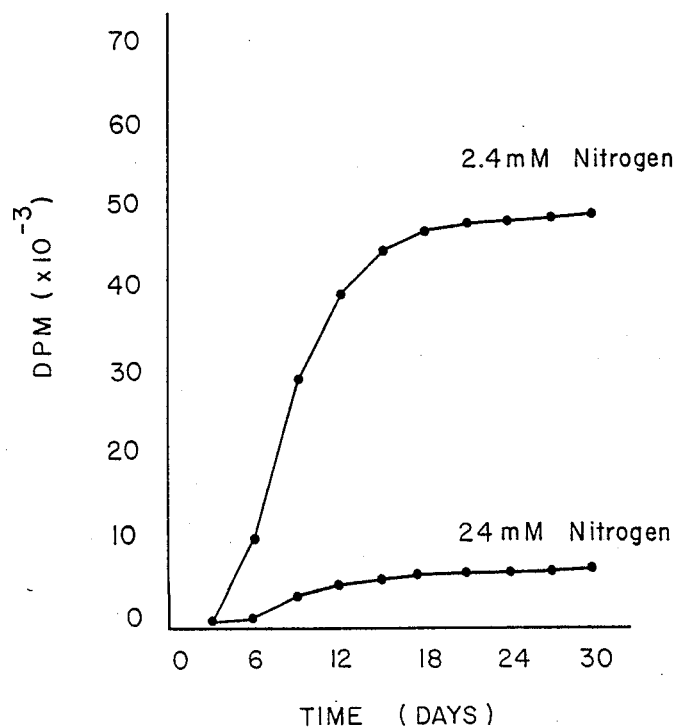
FIG. 4 is a graph showing the effect of nutrient nitrogen concentration on the evolution of $^{14}CO_2$ from $^{14}C$-lignin in cultures of *Phanerochaete chrysosporium*.

These results are graphically illustrated in FIG. 4.

TABLE 5

DDT

| | High Nitrogen | | "Regular" Nitrogen Levels | |
|---|---|---|---|---|
| Day | dpm/3 days | Running Total | dpm/3 days | Running Total |
| 3 | 0 | 0 | 2 | 2 |
| 6 | 51 | 51 | 812 | 814 |
| 9 | 374 | 425 | 1526 | 2340 |
| 12 | 172 | 597 | 1567 | 3907 |
| 15 | 119 | 716 | 1931 | 5838 |
| 18 | 157 | 873 | 1179 | 7017 |
| 21 | 119 | 992 | 296 | 7313 |
| 24 | 85 | 1077 | 164 | 7477 |
| 27 | 50 | 1127 | 140 | 7617 |

Figure 3:
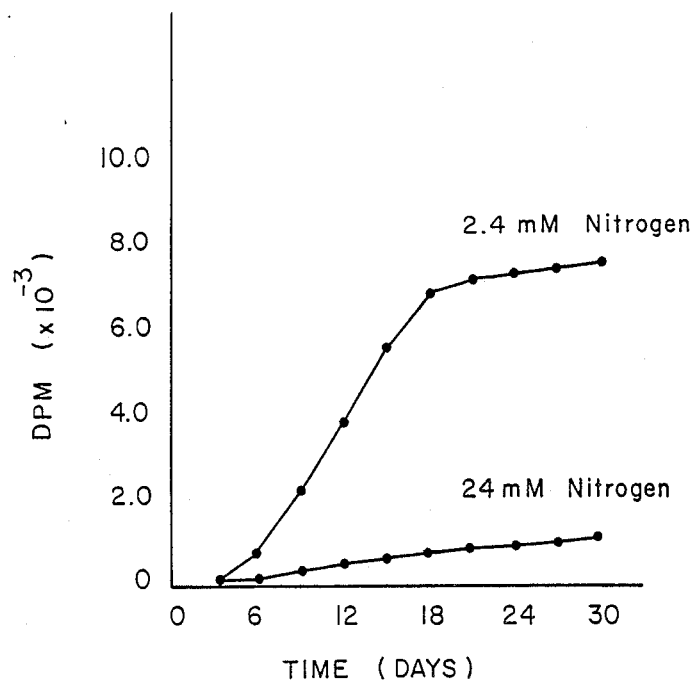
FIG. 3 is a graph showing the effect of nutrient nitrogen on the evolution of $^{14}CO_2$ from $^{14}C$-DDT in cultures of *Phanerochaete chrysosporium*.

These results are illustrated in FIG. 3.

TABLE 6

3,4,7,8,-TCDD

| Day | dpm/3 days | Running Total |
|---|---|---|
| 3 | 8 | 8 |
| 6 | 631 | 639 |
| 9 | 817 | 1456 |
| 12 | 591 | 2047 |
| 15 | 560 | 2607 |
| 18 | 395 | 3002 |
| 21 | 138 | 3140 |
| 24 | 71 | 3211 |
| 27 | 57 | 3268 |

TABLE 7

Lindane

| Day | dpm/3 days | Running Total |
|---|---|---|
| 3 | 78 | 78 |
| 6 | 1958 | 2036 |
| 9 | 1850 | 3886 |
| 12 | 1185 | 3071 |
| 15 | 888 | 5959 |
| 18 | 604 | 6563 |
| 21 | 202 | 6765 |
| 24 | 90 | 6855 |

TABLE 7-continued

Lindane

| Day | dpm/3 days | Running Total |
|---|---|---|
| 27 | 75 | 6930 |

TABLE 8

TCB and HCB

| Day | dpm/3 days | Running Total | dpm/3 days | Running Total |
|---|---|---|---|---|
| 3 | 5 | 5 | 0 | 0 |
| 6 | 211 | 216 | 167 | 167 |
| 9 | 226 | 442 | 370 | 537 |
| 12 | 163 | 605 | 336 | 873 |
| 15 | 145 | 750 | 287 | 1160 |
| 18 | 135 | 886 | 321 | 1481 |
| 21 | 47 | 933 | 82 | 1563 |
| 24 | 26 | 959 | 40 | 1603 |
| 27 | 17 | 976 | 43 | 1646 |

Figure 2:
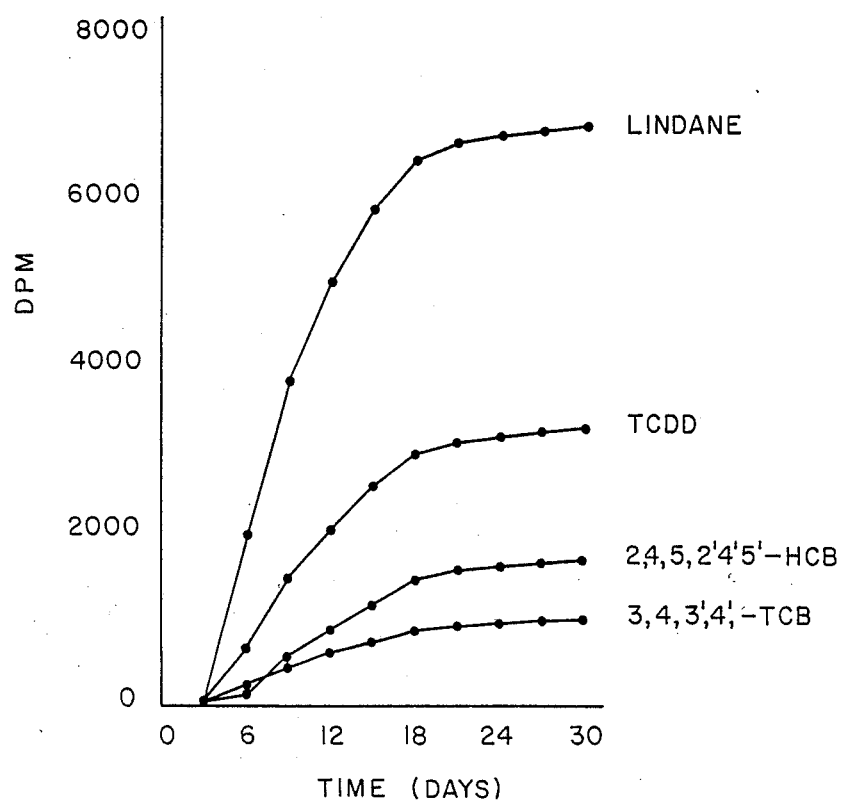
FIG. 2 is a graph showing $^{14}CO_2$ evolution by nitrogen deficient cultures of *Phanerochaete chrysosporium* containing selected $^{14}$C-labeled organohalides including lindane, TCDD, 2,4,5,2',4',5' HCB and 3,4,3',4' TCB.

These results are graphically illustrated in FIG. 2.

$^{14}CO_2$ evolution from $^{14}$C-DDT by *Phanerochaete chrysosporium* was a reproducible phenomena in each case.

In addition to $^{14}$C-DDT, *Phanerochaete chrysosporium* was able to metabolize $^{14}$C-2,4,5,2'4 ,5', HCB $^{14}$C-3,4,3',4'-TCB, $^{14}$C-lindane, and dioxin to $^{14}CO_2$.

$^{14}$CO evolution from $^{14}$C-lignin coincides with $^{14}CO_2$ evolution from each of these compounds. This suggests that the lignin degrading system of *Phanerochaete chrysosporium* is employed in the degradation of these organohalides.

High nitrogen concentration suppressed $^{14}CO_2$ evolution from $^{14}$C-DDT. This was the same phenomena observed with $^{14}CO_2$ evolution from lignin. See Kirk. This further indicates that the lignin degrading system of *Phanerochaete chrysosporium* is involved in degradation of these organohalides.

EXAMPLE 7

This example presents data from experiments designed to demonstrate reproducibility of the initial finding of DDT degradation.

Protocol: Eight cultures of *Phanerochaete chrysosporium* containing 1.7 ppm DDT were set up in triplicate. In addition, two control cultures (minus *Phanerochaete chrysosporium*) were set up in duplicate. Cultures were sealed with a #5 rubber stopper and incubated in the dark at 37° C.

On days 3, 6, 9, 12, 15, 21 and 30, three cultures and two control cultures were analyzed for DDT concentration. Because the final concentration of the standard was 170 ppb (3.4 microliter DDT) (5.0 micogram/milliliter diluted to 100 ml with petroleum ether), this value was chosen for calibration. It should be noted that 170 ppb is also the concentration one would expect if no DDT was metabolized. An exception to the procedure previously described was that after the extract was collected in a 100 ml flask, no further dilution was required for gas chromatographic analysis.

A standard was injected before and after each assay. The average of the two standards was used to determine the percentage DDT remaining.

Each culture was assayed three times for DDT concentration and the average was determined.

The values obtained for each of the three cultures were averaged.

TABLE 9

| Day | (1) Culture | (2) Culture | (3) Culture | Ave |
|-----|-------------|-------------|-------------|-----|
| 3   | 88.2        | 85.1        | 87.9        | 87  |
| 6   | 87.7        | 76.7        | 84.5        | 83  |
| 9   | 74.2        | 63.2        | 74.7        | 71  |
| 12  | 61.4        | 70.9        | 65.7        | 66  |
| 15  | 68.0        | 57.7        | 44.1        | 57  |
| 21  | 85.2*       | 45.5        | 46.1        | 59  |

*believed to be an error in reading

Figure 5:
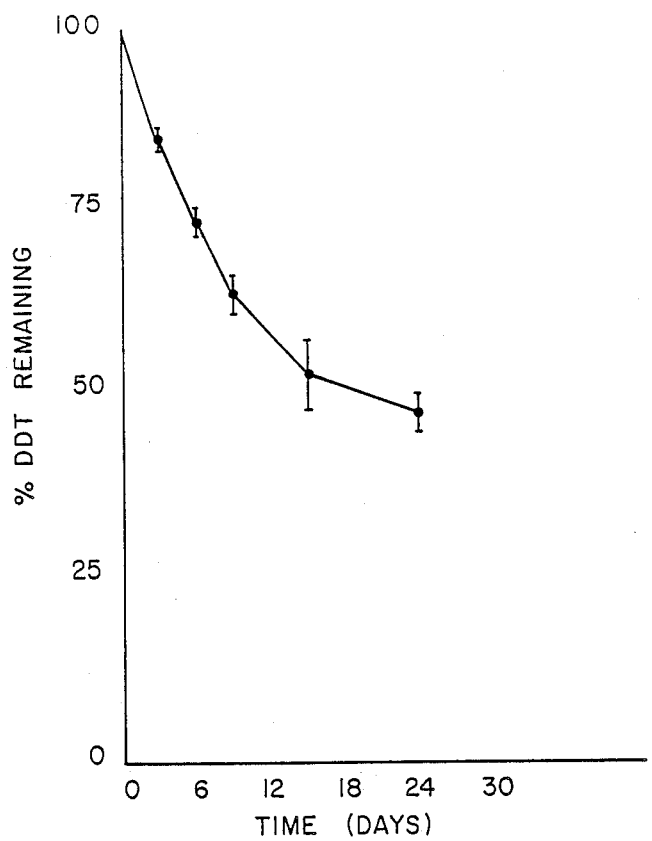
FIG. 5 is a graph showing the disappearance of DDT in nutrient nitrogen deficient cultures of *Phanerochaete chrysosporium*.

The study was repeated and the results are graphically illustrated in FIG. 5.

The results were reproducible and comparable to the earlier studies and clearly indicate the DDT is significantly degraded by *Phanerochaete chrysosporium* cultures.

EXAMPLE 8

Figure 6:
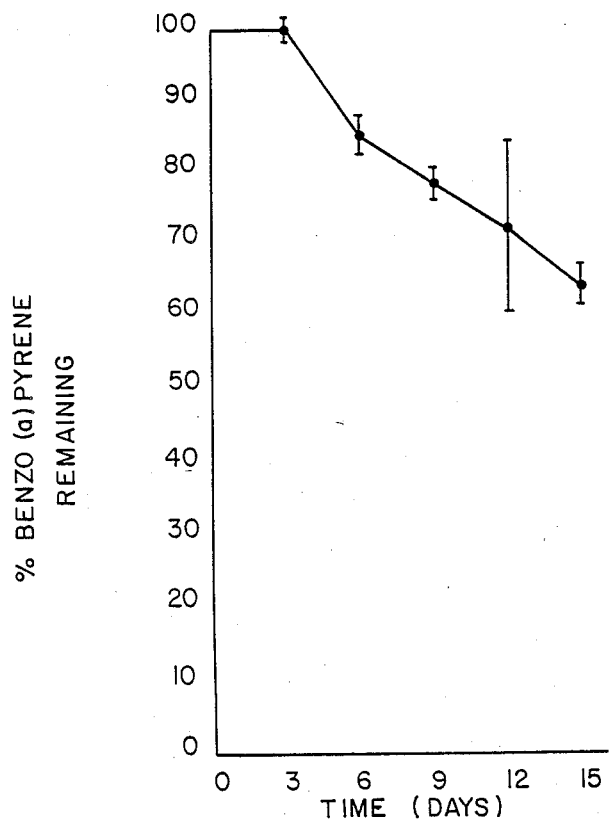
FIG. 6 is a graph showing the disappearance of benzo(a)pyrene in nutrient nitrogen deficient cultures of *Phanerochaete chrysosporium*.
Figure 7:
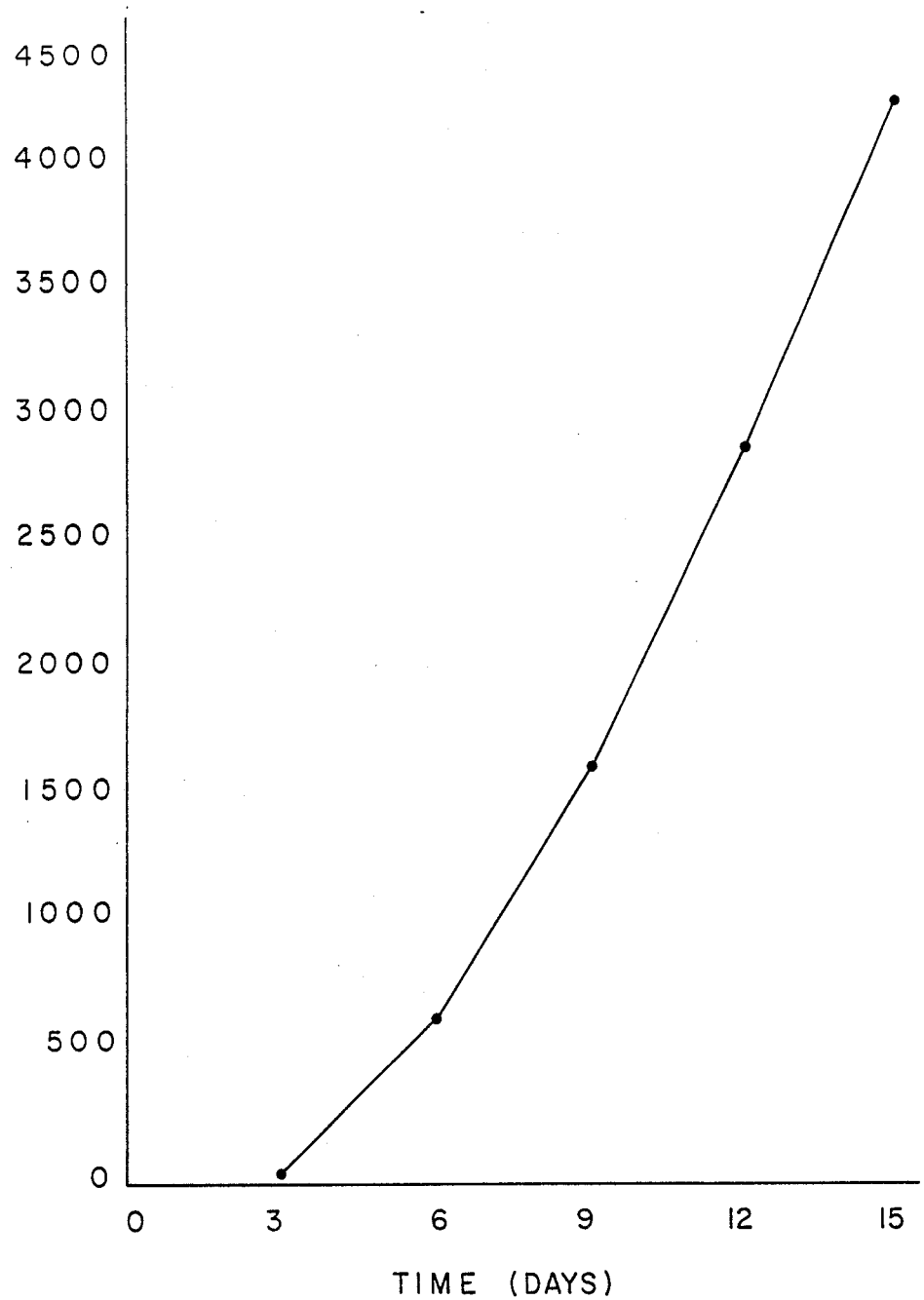
FIG. 7 is a graph showing evolution of $^{14}CO_2$ from $^{14}C$-benzo(a)pyrene in nutrient nitrogen deficient cultures of *Phanerochaete chrysosporium*.

FIGS. 6 and 7 graphically illustrate the results for the degradation of benzo(a)pyrene with *Phanerochaete chrysosporium* in the manner of Examples 6 and 7. As can be seen, this resistant chemical is degraded to $CO_2$.

EXAMPLE 9

*Phanerochaete chrysosporium* (BKM-F-1767) was obtained from the United States Department of Agriculture, Forest Products Laboratory, Madison, Wis. The fungus was maintained on malt agar slants at room temperature until used. Subcultures were routinely made every 30-60 days.

Carbon-14 labeled Chlordane (5.91 mCi/mmole), phenanthrene (10 mCi/mmole), 2-methylnaphthalene (8.57 mCi/mmole), p-cresol (10.33 mCi/mmole), pentachlorophenol (PCP) (10.57 mCi/mmole) and biphenyl (15.91 mCi/mmole) were purchased from Pathfinder Laboratories, Inc. (St. Louis, Miss.) Carbon-14 labeled Aroclor 1254 (32 mCi/mmole) was purchased from Amersham (Arlington Heights, Ill.). Carbon-14 labeled dicofol (9.73 mCi/mmole) was a gift from the Rohm and Haas Co. (Springhouse, Pa.).

Chlordane, Arclor 1254, pentachlorophenol, p-cresol and biphenyl were uniformly labeled. Dicofol was uniformly labeled only in the aromatic rings, while phenanthrene and 2-methylnaphthalene were labeled in the 9 and 8 positions, respectively. The radiochemical purity of chemicals used was 98% or greater. In the case of $^{14}C$-Aroclor 1254, a polychlorinated biphenyl (PCB) mixture, it was shown that approximately 98% of the radioactivity in this mixture comigrated with authentic unlabeled Aroclor 1254 during TLC in hexane. Comparison of $^{14}C$-Aroclor 1254 with unlabeled Aroclor 1254 by GLC reveals that they are very similar in composition, although minor differences in their GLC elution patterns could be detected.

*Phanerochaete chrysosporium* was incubated at 37° to 39° C. in 10 ml of the liquid culture media described by Kirk. This medium consisted of 56 mM glucose, 1.2 mM ammonium tartrate, trace elements and thiamine (1 mg/1) in 20 mM dimethyl succinate buffer (pH 4.2). Cultures were established by innoculating this media with spores as described. For mineralization studies, $^{14}C$-labeled chemical in a minimal (<30 1) volume of acetone was added at this time.

During the first 3 days of incubation, cultures were allowed to grow under an atmosphere of air in culture bottles equipped with a gas exchange manifold. After 3 days, and at 3-day intervals thereafter, cultures were gently flushed with oxygen. The atmosphere from each culture was forced through 10 ml of an ethanolamine-containing scintillation cocktail which served as a $CO_2$ trap. Radioactivity in the $CO_2$ was assayed by liquid scintillation spectrometry.

HPLC of $^{14}C$-dicofol metabolites was performed using a system equipped with an Alltex pump (Model 110A), a Rheodyne injector, an Alltech R-Sil C-18 reverse phase column (4.6×250 mm) and a Schoeffel director (Model 770). Isocratic elution was performed using 85% methanol. The retention time of dicofol and dicofol metabolites was established by monitoring the elution of authentic standards at 238 nM.

To establish the presence of $^{14}C$-dicofol metabolites, four cultures (10 ml) of *Phanerochaete chrysosporium* which had been incubated with $^{14}C$-dicofol (5.0 nmoles/culture) were pooled. Twenty-five ml of acetonitrile then were added and the mixture was homogenized in a Potter Elvehjem hand homogenizer equipped with a Teflon pestle. The homogenized material then was extracted with two 50 ml portions of hexane which were pooled. The extract then was dried over magnesium sulfate and filtered. Hexane subsequently was removed by evaporation under Argon.

Following hexane extraction, the aqueous phase was acidified to pH 2.0 with concentrated HCl and extracted with two 50 ml portions of methylene chloride which were pooled. The methylene chloride extract then was dried over magnesium sulfate and filtered. Methylene chloride subsequently was removed by evaporation under Argon.

The hexane extracts then were dissolved in hexane (−1 ml) while the methylene chloride extracts were dissolved in methanol (−1 ml). Ten to 20 of these were used for HPLC analyses. Precipitates which were sometimes formed upon concentration were removed by filtration through glass wool or by centrifugation.

Following sample injection, 1 ml aliquots were collected in scintillation vials. Ten ml of Safety Solve (Research Products International Corp., Mount Prospect, Ill.) then were added to each vial and radioactivity was determined by liquid scintillation spectrometry.

Cultures of *Phanerochaete chrysosporium* incubated with $^{14}C$-phenanthrene were extracted using the same procedures for mass balance experiments. For HPLC analysis of phenanthrene metabolites, cultures were acidified and extracted with methylene chloride. The methylene chloride extract (100 ml) was concentrated to 2 ml under a gentle flow of Argon in a centrifuge tube. The extract then was allowed to sit uncovered in a fume hood overnight. During this time, the remaining methylene chloride evaporated.

The residue was redissolved in methanol and subjected to HPLC analysis. Thin layer chromatography was performed on hexane and methylene chloride extracts obtained from cultures of *Phanerochaete chrysosporium* that had been incubated with $^{14}C$-Chlordane. Extraction of these cultures and concentration of hexane and methylene chloride extracts were performed as described above for extraction of $^{14}C$-dicofol and $^{14}C$-phenanthrene.

Aliquots of the hexane and methylene chloride extracts were chromatographed on pre-coated, aluminum-backed thin layer plates (5×20 cm, Silica Gel 60 $F_{254}$, EM Science, Cherry Hill, N.J.). The solvent system for chromatography, 1 cm fractions were scraped from the thin layer plate and placed into scintillation vials. Ten ml of Safety Solve then were added to each vial and radioactivity was determined by liquid scintillation spectrometry.

Following incubation of $^{14}C$-labeled chemicals in nutrient nitrogen deficient cultures of *Phanerochaete chrysosporium*, cultures were extracted sequentially with hexane and methylene chloride as described above. Following extraction, mycelium was separated from the aqueous fraction by filtration. Ten ml of Safety Solve then were added to the recovered mycelium in a scintillation vial. Ten ml of Safety Solve also were added to 1 ml aliquots of the hexane, methylene chloride and aqueous fractions. The radioactivity of all fractions was determined by liquid scintillation spectrometry.

Table 10 shows that a wide variety of structurally diverse organohalides and polycyclic aromatic hydrocarbons are mineralized by *Phanerochaete chrysosporium* under limiting conditions. In general, very little or no mineralization occurred during the first 3 days of incubation in spite of the fact that abundant growth, as evidenced by the appearance of a mycelial mat, occurred during this time. However, substantial mineralization typically began between day 3 and day 6 of the incubation and usually was maximal between day 3 and days 12 to 18. Although the rate of mineralization generally declined during the last one-half of the 30-day incubation period, in no case did mineralization cease. Furthermore, when supplemental glucose was added after 30 days of incubation, the rate of mineralization of $^{14}C$-labeled compounds increased in all cases.

A lag period before the onset of mineralization is consistent with the hypothesis that the lignin degrading system of this fungus is, at least in part, responsible for the biodegradative abilities of this fungus because a similar lag period is seen before mineralization of $^{14}C$-lignin.

TABLE 10

| | Initial Concentration of $^{14}C$-labeled Compound (nmoles/culture) | Radiolabeled Substrate Evolved as $^{14}CO_2$ (pmoles ± 50) | | % of Radiolabeled Substrates Evolved as $^{14}CO_2$ in 60 Days |
|---|---|---|---|---|
| | | 30 days | 60 days | |
| Pentachlorophenol | 1.25 | 521 | 570.2 | 46 |
| Chlordane | 5.0 | 508 | 608 | 12 |
| Aroclor 1254 | 1.25 | 179 | 224 | 18 |
| Dicofol | 5.0 | 801 | 1265 | 25 |
| Phenanthrene | 5.0 | 621 | 738 | 15 |
| 2-methylnapthalene | 5.0 | 366 | 437 | 9 |
| Biphenyl | 1.25 | 367 | 456 | 37 |
| P-cresol | 5.0 | 2087 | 2378 | 48 |

Discussion of Experimental Data

The studies using $^{14}C$-labeled compounds demonstrated that all the compounds tested (DDT, 2,4,5,2',4',5'-HCB, 3,4,3',4'-TCB, TCDD, Lindane, and benzo(a)pyrene) were degraded to carbon dioxide by nitrogen deficient cultures of *Phanerochaete chrysosporium*. Because all of the radiolabeled compounds were labeled exclusively in ring carbons, it can be concluded that *Phanerochaete chrysosporium* has the ability to degrade halogenated aromatic rings of environmental pollutants which are normally difficult to degrade using microorganisms. It is also apparent that *Phanerochaete chrysosporium* is able to dechlorinate alkyl chlorides as evidenced by the fact that Lindane, a compound which is chlorinated on every carbon atom, is degraded to carbon dioxide. Collaborating evidence was obtained in DDT metabolite studies in which it was demonstrated that DDT is converted to DDD as a result of reductive dechlorination.

In all mineralization experiments, $^{14}CO_2$ evolution was induced between the third and sixth day of incubation and showed a maximum rate between the third and eighteenth day of incubation after which $^{14}CO_2$ evolution continued at decreasing rates until the end of the thirty day incubation.

Using $^{14}C$-DDT demonstrated that $^{14}CO_2$ evolution was dependent on the presence of glucose. After the 30 day incubation period, increased rates of $^{14}CO_2$ evolution could be induced simply by adding glucose to the glucose depleted culture. It was also shown that the rate of $^{14}CO_2$ evolution was dependent on the absolute concentration of glucose in the culture medium. For example, a two-fold increase in the glucose concentration (from 56 mM to 112 mM) was shown to more than double the amount of $^{14}CO_2$ evolved over the 30 day incubation period. It is important to note that even in stationary phase cultures, constitutive levels of $^{14}CO_2$ evolution continued to occur.

In other experiments, the rate of DDT disappearance was monitored by GLC. It was shown that 50–60% of the DDT initially present in culture was metabolized during the 30 day incubation period. DDD, dicofol and DBP were identified as major metabolites. Upon addition of more glucose and continued incubation for 18 more days, it was demonstrated that more than 90% of the DDT initially present had been metabolized. Furthermore, there was no significant accumulation of identifiable DDT metabolites.

By comparison, lignin degradation in *Phanerochaete chrysosporium* was induced in nitrogen deficient cultures after approximately 3 days of incubation, after which $^{14}CO_2$ evolution from $^{14}C$-lignin was observed. Maximal rates of lignin degradation, as assayed by $^{14}CO_2$, were observed between day 3 and day 18 of the incubation. Lignin degradation continues to occur, albeit at successively lower rates, until the glucose concentration was depleted. The presence of a suitable carbohydrate source was critical in this system because hydrogen peroxide, a required cosubstrate for lignin degradation, was generated in actively respiring cultures. The same pattern of induction at day 3, maximal activity between days 6 and 18, and subsequent metabolism until the glucose supply was depleted was observed in $^{14}C$-lignin degradation to $^{14}CO_2$, nitrogen sufficient cultures suppressed lignin degradation. Again, the same pattern was seen for the degradation of $^{14}$-DDT.

SUMMARY

In summary, the present invention accomplishes each of the objects set forth above. The invention provides a very effective method for degrading persistent organic pollutants. Until now, techniques for removal and disposal of these pollutants have been inadequate at best.

The present invention discloses methods for employing the lignin-degrading enzyme system produced by white rot fungi to degrade such pollutants. This enzyme system is found to be nonspecific and usable to degrade a wide variety of otherwise persistent pollutants. Using the enzyme system described, it is possible to degrade such troublesome and toxic pollutants as DDT, PCB, PBB and dioxin. Mixing the fungi or the enzyme system produced by the fungi with the pollutant, is sufficient to induce degradation. If desirable, degradation may proceed only until carbon dioxide and water remain as degradation products.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A method for degrading environmentally persistent halogenated organic compounds, the method comprising the steps of:
    (a) reacting at least one environmentally persistent polyhalogenated hydrocarbon compound having two or more aromatic rings with fungal enzymes containing at least one lignin-degrading enzyme expressed by white rod fungi in an environment containing hydrogen peroxide; and
    (b) allowing the degradation reaction to proceed until said environmentally persistent polyhalogenated hydrocarbon compound is converted to substantially less toxic degradation products.

2. A method for degrading environmentally persistent halogenated hydrocarbon compounds as defined in claim 1 wherein the environmentally persistent polyhalogenated organic compound comprises a polychlorinated hydrocarbon compound having two or more aromatic rings.

3. A method for degrading environmentally persistent halogenated hydrocarbon compounds as defined in claim 2 wherein the fungal enzyme is expressed by living white rot fungi placed in contact with the at least one environmentally persistent polyhalogenated hydrocarbon compound.

4. A method for degrading environmentally persistent halgenated hydrocarbon compounds as defined in claim 3, further comprising the step of allowing the degradation reaction to proceed until said polyhalogenated hydrocarbon compound is converted to nontoxic degradation products comprising carbon dioxide and water.

5. A method for degrading environmentally persistent halogenated hydrocarbon compounds as defined in claim 4 wherein the hydrogen peroxide is produced by the white rot fungus.

6. A method for degrading environmentally persistent halogenated hydrocarbon compounds as defined in claim 3, wherein the environmentally persistent polyhalogenated hydrocarbon compound is converted to nontoxic intermediate degradation products.

7. A method for degrading enviornmentally persistent halogenated hydrocarbon compounds as defined in claim 6, wherein the hydrogen peroxide is produced by the white rot fungus.

8. A method for degrading environmentally persistent halogenated hydrocarbon compounds as defined in claim 3 wherein before step (a) the fungus has been grown in a growth medium containing a minimal nitrogen source level.

9. A method for degrading environmentally persistent halogenated hydrocarbon compounds as defined in claim 8 wherein the growth medium include sources of carbon, thiamine and minerals for the fungus.

10. A method for degrading environmentally persistent halogenated hydrocarbon compounds as defined in claim 3 wherein the white rot fungus is combined with soil containing the at least one polychlorinated biphenyl and such that degradation takes place in situ.

11. A method for degrading environmentally persistent halogenated hydrocarbon compounds as defined in claim 3 wherein nutrient are added during the degradation process.

12. A method for degrading environmentally persistent halogenated hydrocarbon compounds as defined in claim 11 wherein the nutrient contain lignin.

13. A method for degrading environmentally persistent halogenated hydrocarbon compounds as defined in claim 12 the nutrients contain glucose.

14. A method for degrading environmentally persistent halogenated hydrocarbon compounds as defined in claim 12 wherein the nutrient are added periodically during the degradation process.

15. A method for degrading environmentally persistent halogenated hydrocarbon compounds as defined in claim 12 wherein the nutrient comprises corn cobs.

16. A method for degrading environmentally persistent halogenated hydrocarbon compounds as defined in claim 12 wherein the nutrient comprises peas.

17. A method for degrading environmentally persistent halogenated hydrocarbon compounds as defined in claim 12 the nutrient comprises straw.

18. A method for degrading environmentally persistent halogenated hydrocarbon compounds as defined in claim 12 wherein the nutrient comprises saw dust.

19. A method for degrading environmentally persistent halogenated hydrocarbon compounds as defined in claim 12 wherein the nutrient comprises peanut shells.

20. A method for degrading environmentally persistent halogenated organic compounds, the method comprising the steps of:
    (a) reacting at least one environmentally persistent polybrominated hydrocarbon compound having two or more aromatic rings with fungal enzymes containing at least one lignin-degrading enzyme expressed by white rot fungi in an environment containing hydrogen peroxide; and
    b) allowing the degradation reaction to proceed until said environmentally persistent polybrominated hydrocarbon compound is converted to substantially less toxic degradation products.

21. A method for degrading environmentally persistent halogenated hydrocarbon compounds as defined in claim 20 wherein the fungal enzyme is expressed by living white rot fungi placed in contact with the at least one environmentally persistent polybrominated hydrocarbon compound.

22. A method for degrading environmentally persistent halogenated hydrocarbon compounds as defined in claim 21, further comprising the step of allowing the degradation reaction to proceed until said environmentally persistent polybrominated hydrocarbon compound is converted to nontoxic degradation products comprising carbon dioxide and water.

23. A method for degrading environmentally persistent halogenated hydrocarbon compounds as defined in claim 22 wherein the hydrogen peroxide is produced by the white rot fungus.

24. A method for degrading environmentally persistent halogenated hydrocarbon compounds as defined in claim 21, wherein the environmentally persistent polybrominated hydrocarbon compound is converted to nontoxic intermediate degradation products.

25. A method for degrading environmentally persistent halogenated hydrocarbon compounds as defined in claim 24, wherein the hydrogen peroxide is produced by the white rot fungus.

26. A method for degrading environmentally persistent halogenated hydrocarbon compounds as defined in claim 21 wherein before step (a) the fungus has been grown in a growth medium containing a minimal nitrogen source level.

27. A method for degrading environmentally persistent halogenated hydrocarbon compounds as defined in claim 26 wherein the growth medium include sources of carbon, thiamine and minerals for the fungus.

28. A method for degrading environmentally persistent halogenated hydrocarbon compounds as defined in claim 21 wherein the white rot fungus is combined with soil containing the at least one polybrominated biphenyl and such that degradation takes place in situ.

29. A method for degrading environmentally persistent halogenated hydrocarbon compounds as defined in claim 21 wherein nutrients are added during the degradation process.

30. A method for degrading environmentally persistent halogenated hydrocarbon compounds as defined in claim 29 wherein the nutrients contain lignin.

31. A method for degrading environmentally persistent halogenated hydrocarbon compounds as defined in claim 30 wherein the nutrients contain glucose.

32. A method for degrading environmentally persistent halogenated hydrocarbon compounds as defined in claim 30 wherein the nutrients are added periodically during the degradation process.

33. A method for degrading environmentally persistent halogenated hydrocarbon compounds as defined in claim 30 wherein the nutrient comprises corn cobs.

34. A method for degrading environmentally persistent halogenated hydrocarbon compounds as defined in claim 30 wherein the nutrient comprises peas.

35. A method for degrading environmentally persistent halogenated hydrocarbon compounds as defined in claim 30 the nutrient comprises straw.

36. A method for degrading environmentally persistent halogenated hydrocarbon compounds as defined in claim 30 wherein the nutrient comprises saw dust.

37. A method for degrading environmentally persistent halogenated hydrocarbon compounds as defined in claim 30 wherein the nutrient comprises peanut shells.

38. A method for degrading environmentally persistent pesticides, the method comprising the steps of:
(a) reacting at least one environmentally persistent pesticide with fungal enzymes containing a lignin-degrading enzyme expressed by white rot fungi in an environment containing hydrogen peroxide; and
(b) allowing the degradation reaction to proceed until the environmentally persistent pesticide is converted to substantially less toxic degradation products.

39. A method for degrading environmentally persistent pesticides as defined in claim 38 wherein the pesticide comprises DDT.

40. A method for degrading environmentally persistent pesticides as defined in claim 38 wherein the fungal enzyme is expressed by living white rot fungus placed in contact with the pesticide.

41. A method for degrading environmentally persistent pesticides as defined in claim 40, further comprising the step of allowing the degradation reaction to proceed until said environmentally persistent pesticide is converted to nontoxic degradation products comprising carbon dioxide and water.

42. A method for degrading environmentally persistent pesticides as defined in claim 41 wherein the hydrogen peroxide is produced by the white rot fungus.

43. A method for degrading environmentally persistent pesticides as defined in claim 40, wherein the environmentally persistent pesticides is converted to nontoxic intermediate degradation products.

44. A method for degrading environmentally persistent pesticides as defined in claim 43, wherein the hydrogen peroxide is produced by the white rot fungus.

45. A method for degrading environmentally persistent pesticides as defined in claim 40 wherein before step (a) the fungus has been grown in a growth medium containing a minimal nitrogen source level.

46. A method for degrading environmentally persistent pesticides as defined in claim 45 wherein the growth medium includes a source of carbon, thiamine and minerals for the fungus.

47. A method for degrading environmentally persistent pesticides as defined in claim 40 wherein the white rot fungus is combined with soil containing the pesticide such that degradation of the pesticide takes place in situ.

48. A method for degrading environmentally persistent pesticides as defined in claim 40 wherein nutrients are added during the degradation process.

49. A method for degrading environmentally persistent pesticides as defined in claim 48 wherein the nutrients contain lignin.

50. A method for degrading environmentally persistent pesticides as defined in claim 49 wherein the nutrients comprise glucose.

51. A method for degrading environmentally persistent pesticides as defined in claim 49 wherein the nutrients are added periodically during the degradation process.

52. A method for degrading environmentally persistent pesticides as defined in claim 49 wherein the nutrients are selected from the group consisting of corn cobs, peas, straw, sawdust, and peanut shells.

53. A method for degrading polyhalogenated dioxin comprising the steps of:
(a) reacting polyhalogenated dioxin with fungal enzymes containing a lignin-degrading enzyme expressed by white rot fungi in an environment containing hydrogen peroxide; and
(b) allowing the degradation reaction to proceed until the polyhalogenated dioxin in converted to substantially less toxic degradation products.

54. A method for degrading polyhalogenated dioxin as defined in claim 53 wherein the fungal enzyme is expressed by living white rot fungi placed in contact with the polyhalogenated dioxin.

55. A method for degrading polyhalogenated dioxin as defined in claim 54, further comprising the step of allowing the degradation reaction to proceed until the polyhalogenated dioxin is converted to nontoxic degradation products comprising carbon dioxide and water.

56. A method for degrading polyhalogenated dioxin as defined in claim 55 wherein the hydrogen peroxide is produced by the white rot fungus.

57. A method for degrading polyhalogenated dioxin as defined in claim 54, wherein the polyhalogenated dioxin is converted to nontoxic intermediate degradation products.

58. A method for degrading polyhalogenated dioxin as defined in claim 54 wherein before step (a) the fungus has been grown in a growth medium containing a minimal nitrogen source level.

59. A method for degrading polyhalogenated dioxin as defined in claim 58 wherein the growth medium include sources of carbon, thiamine and minerals for the fungus.

60. A method for degrading polyhalogenated dioxin as defined in claim 54 wherein the white rot fungus is combined with soil containing the dioxin and such that degradation takes place in situ.

61. A method for degrading polyhalogenated dioxin as defined in claim 54 wherein nutrients are added during the degradation process.

62. A method for degrading polyhalogenated dioxin as defined in claim 61 wherein the nutrients contain lignin.

63. A method for degrading dioxin as defined in claim 62 wherein the nutrients comprise glucose.

64. A method for degrading polyhalogenated dioxin as defined in claim 62 wherein the nutrients are added periodically during the degradation process.

65. A method for degrading dioxin as defined in claim 62 wherein the nutrients are selected from the group consisting of corn cobs, peas, straw, sawdust, and peanut shells.

66. A method for degrading environmentally persistent halogenated organic compounds, the method comprising the steps of:
   (a) reacting Lindane with fungal enzymes containing at least one lignin-degrading enzyme expressed by white rot fungi in an environment containing hydrogen peroxide; and
   (b) allowing the degradation reaction to proceed until said Lindane is converted to substantially less toxic degradation products.

67. A method for degrading environmentally persistent halogenated organic compounds, the method comprising the steps of:
   (a) reacting Chlordane with fungal enzymes containing at least one lignin-degrading enzyme expressed by white rot fungi in an environment containing hydrogen peroxide; and
   (b) allowing the degradation reaction to proceed until said Chlordane is converted to substantially less toxic degradation products.

* * * * *

UNITED STATES PATENT AND TRADEMARK OFFICE
CERTIFICATE OF CORRECTION

PATENT NO. : 4,891,320

DATED : January 2, 1990

INVENTOR(S) : Steven D. Aust et al.

Page 1 of 2

It is certified that error appears in the above-identified patent and that said Letters Patent is hereby corrected as shown below:

Column 1, line 3 of the title, "SHITE ROT FUNGI" should be --WHITE ROT FUNGI--
Abstract, line 40, "orgaic" should be --organic--
Column 1, line 56, "oils" should be --oils.--
Column 3, line 12, after "persistent" add --organic pollutant compounds by reacting those pollutant--
Column 3, lines 45-46, after "and" insert --are--
Column 4, line 52, "insitu" should be --in situ--
Column 4, line 52, "insitu" should be --in situ--
Column 4, line 55, "generated" should be --generate--
Column 5, lines 28-29, "environmental persistent" should be --environmentally persistent--
Column 6, line 6, "there exists may" should be --there exist many--
Column 6, line 25, "dicofol" should be --dicofol.--
Column 7, line 36, "occurs" should be --occur--
Column 8, line 44, "was" should be --were--
Column 10, line 4, "evolutions studies" should be --evolution studies--
Column 10, line 42, after "carbon" add --dioxide evolution) was similar for all three cultures. It--
Column 11, line 9, "Oas" should be --$O_2$ as--
Column 12, line 53, "micogram" should be --microgram--
Column 12, lines 57-58, "if no DDT was metabolized" should be --if no DDT were metabolized--
Column 15, line 18, "under limiting conditions." should be --under nutrient nitrogen-limiting conditions.--
Column 15, line 63, "halogenatd" should be --halogenated--
Column 16, line 48, after "depleted" insert --,--
Column 17, line 22, "white rod fungi" should be --white rot fungi--
Column 17, line 31, "organic" should be --hydrocarbon--
Column 17, line 56, "enviornmentally" should be --environmentally--

UNITED STATES PATENT AND TRADEMARK OFFICE
CERTIFICATE OF CORRECTION

PATENT NO. : 4,891,320

DATED : January 2, 1990

INVENTOR(S) : Steven D. Aust et al.

It is certified that error appears in the above-identified patent and that said Letters Patent is hereby corrected as shown below:

```
Column 17, line 67, "medium include" should be --medium includes--
Column 18, line 8, "nutrient" should be --nutrients--
Column 18, line 12, "contain" should be --contains--
Column 18, line 15, after "claim 12" add --wherein--
Column 18, line 18, "nutrient" should be --nutrients--
Column 18, line 28, after "claim 12" add --wherein--
Column 19, line 14, "medium include" should be --medium includes--
Column 19, line 43, after "claim 30" add --wherein--
Column 21, lines 6-7, "wherein the growth medium include" should be
--wherein the growth medium includes--
Column 22, line 1, "degrading dioxin" should be --degrading
polyhalogenated dioxin--
Column 22, line 6, "organic" should be --hydrocarbon--
Column 22, line 16, "organic" should be --hydrocarbon--
```

Signed and Sealed this

Thirty-first Day of March, 1992

Attest:

HARRY F. MANBECK, JR.

*Attesting Officer*     *Commissioner of Patents and Trademarks*